United States Patent [19]
Heisler

[11] 3,815,313
[45] June 11, 1974

[54] APPARATUS AND METHOD FOR AUTOMATICALLY SIZING AND WRAPPING A SHRINK WRAP ENVELOPE AROUND ADVANCING LUGGAGE

[76] Inventor: Raymond A. Heisler, 657 Dakota Tr., Franklin Lakes, N.J. 07417

[22] Filed: Oct. 4, 1972

[21] Appl. No.: 295,024

[52] U.S. Cl............................. 53/14, 53/30, 53/64, 53/168, 53/182
[51] Int. Cl....................... B65b 9/02, B65b 61/14
[58] Field of Search .......... 53/14, 28, 30, 59 W, 64, 53/66, 134, 168, 180, 182, 184

[56] References Cited
UNITED STATES PATENTS
| | | | |
|---|---|---|---|
| 3,029,571 | 4/1962 | Douthit................................. | 53/66 |
| 3,086,336 | 4/1963 | Rausing et al..................... | 53/389 X |
| 3,367,589 | 2/1968 | Chant et al......................... | 53/389 X |
| 3,504,476 | 4/1970 | Ehrenfried et al.................. | 53/30 X |
| 3,546,850 | 12/1970 | Hatanaka et al................... | 53/168 X |

Primary Examiner—Robert L. Spruill
Attorney, Agent, or Firm—Ralph R. Roberts

[57] ABSTRACT

This invention pertains to the automatic sizing, weighing and wrapping of individual pieces of luggage randomly advanced on a transporting means such as a conveyor. The wrapping is a shrink wrap film whose thickness and width requirement is automatically calculated and supplied. The film is draped and peripherally sealed around the piece of luggage with the handle retained within the sealed wrapping. A handle aperture is formed in an outwardly extending portion of a double layer of film after which the film is heat shrunk to tightly enclose and protect the piece of luggage and provide an integrally attached handle.

22 Claims, 21 Drawing Figures

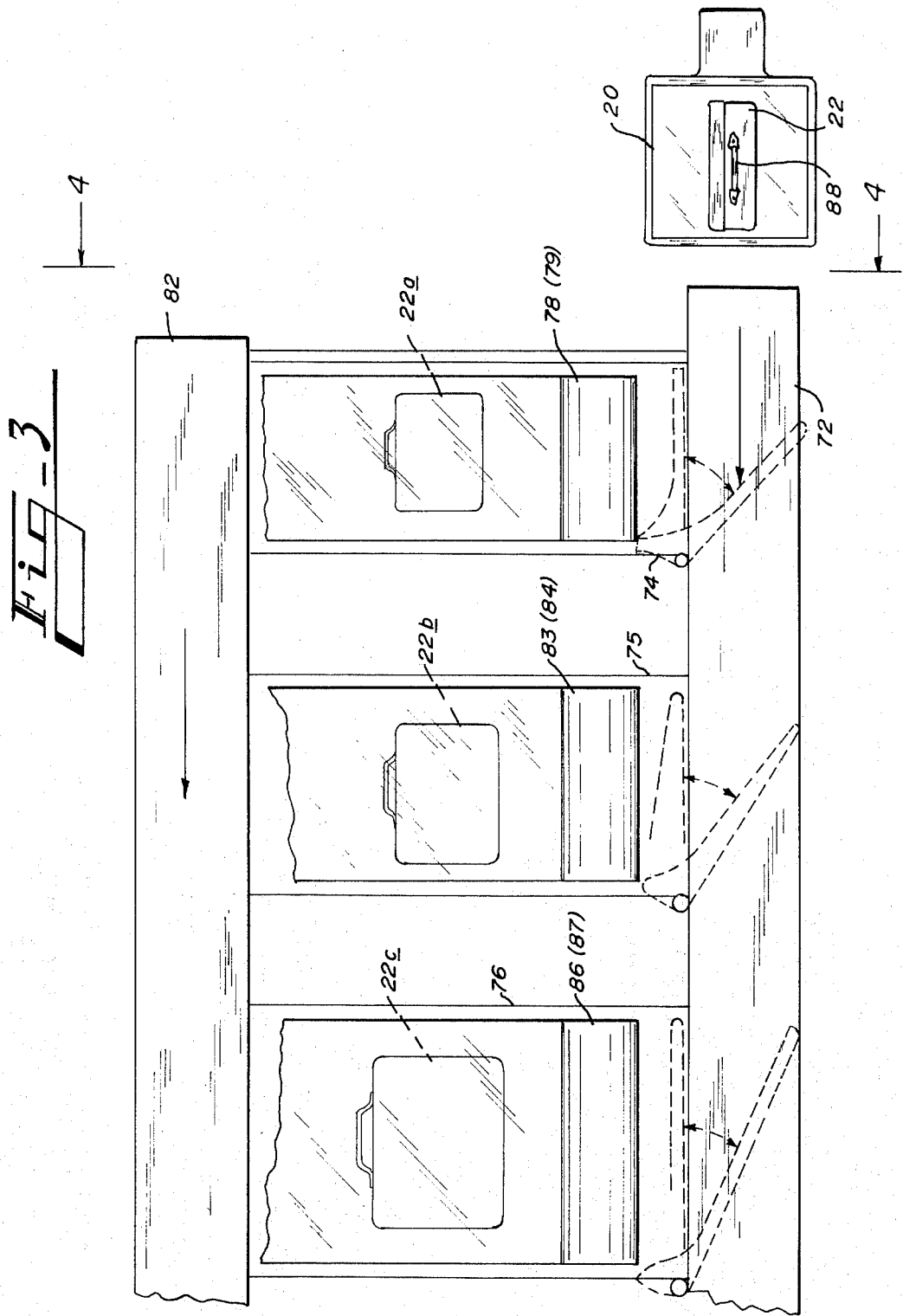

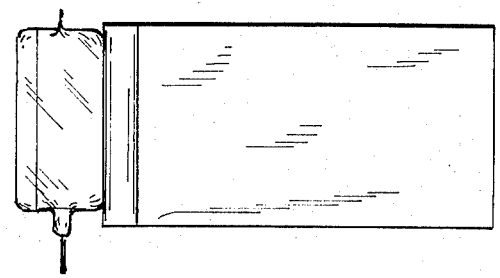
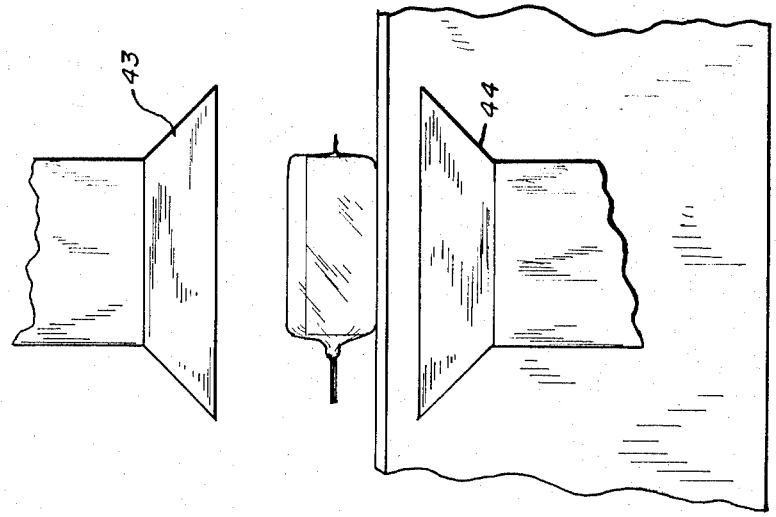
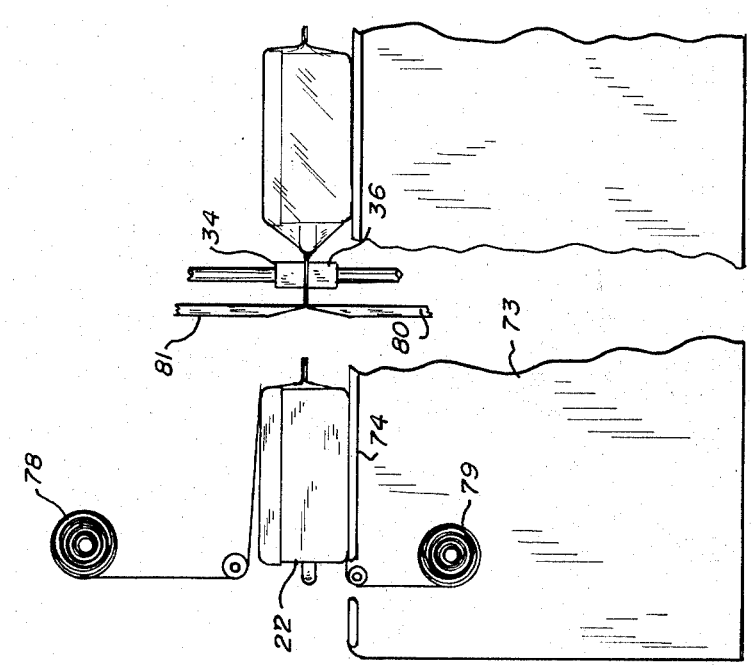

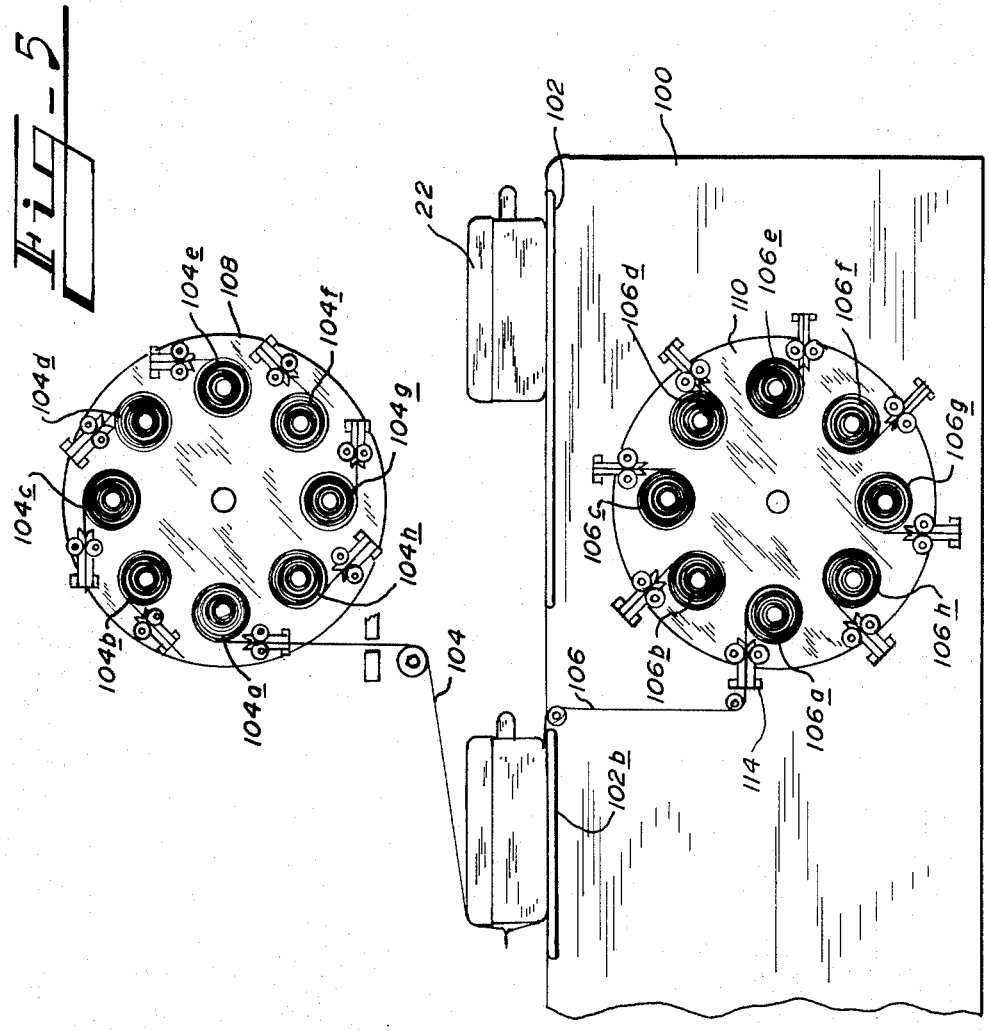
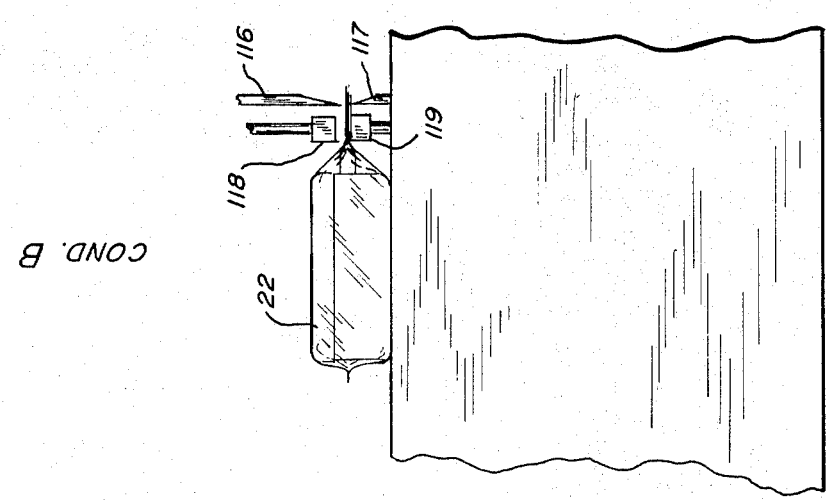

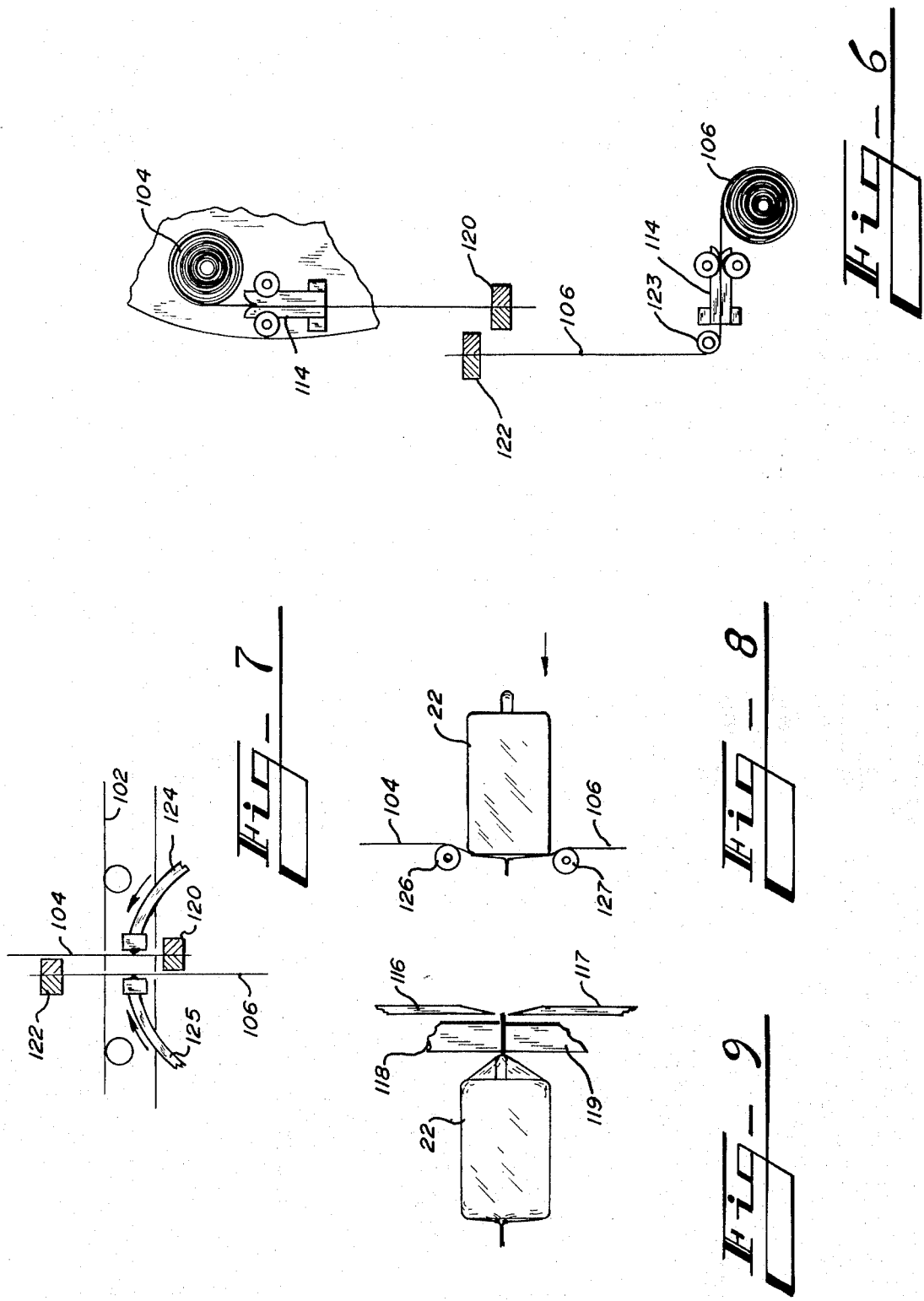

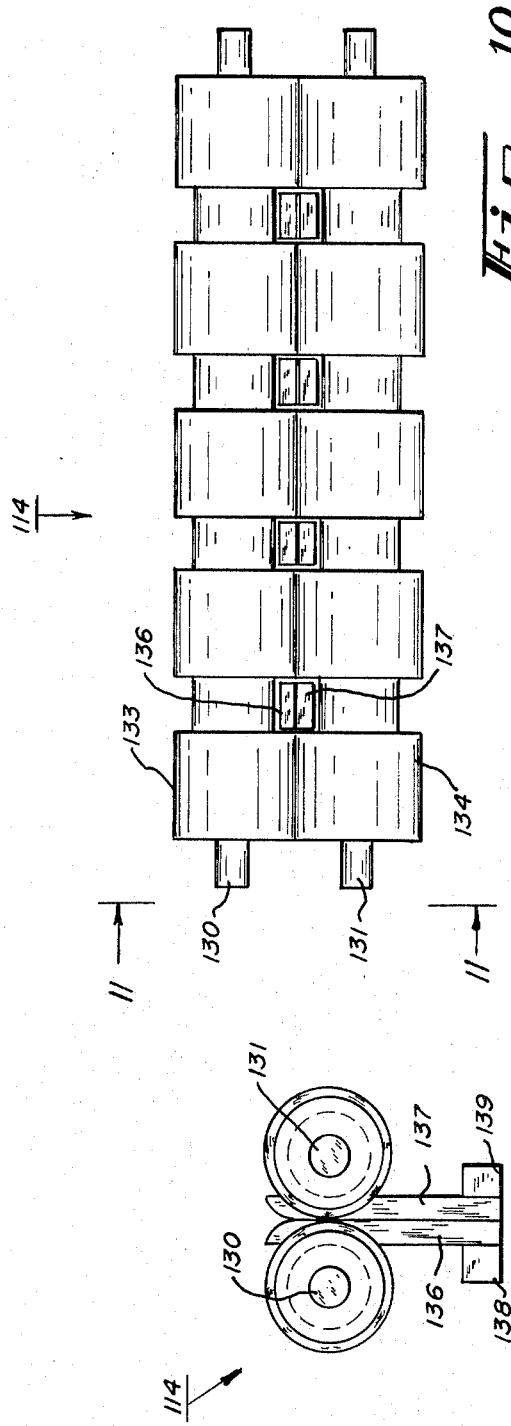
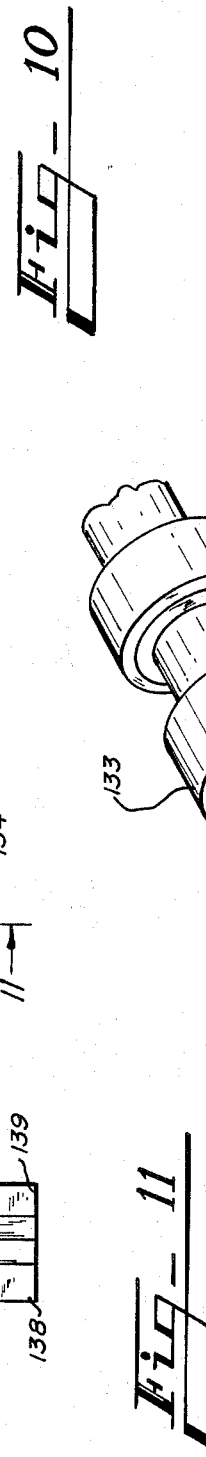
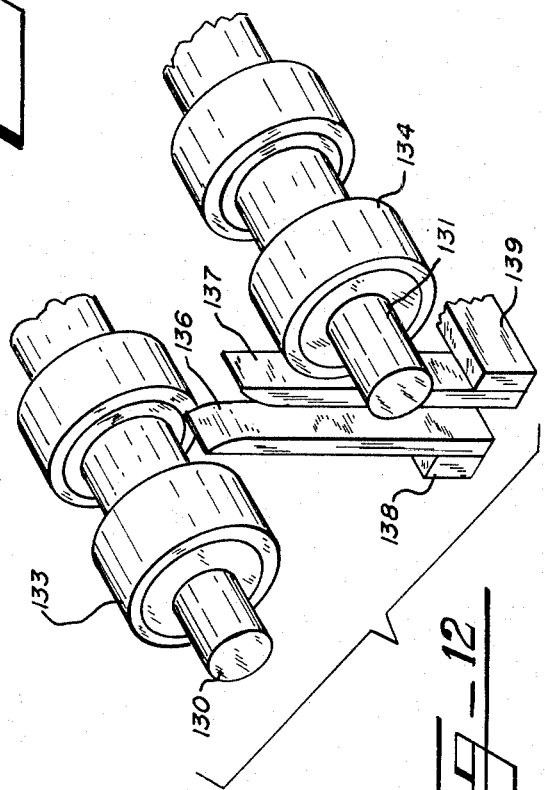

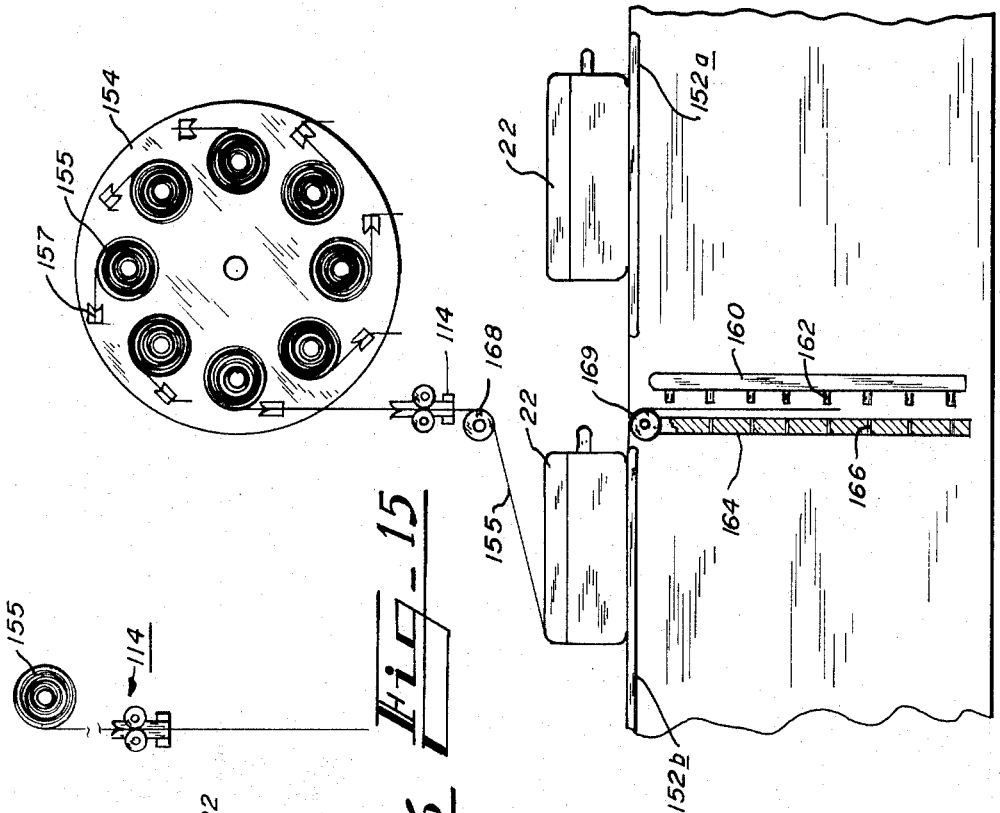
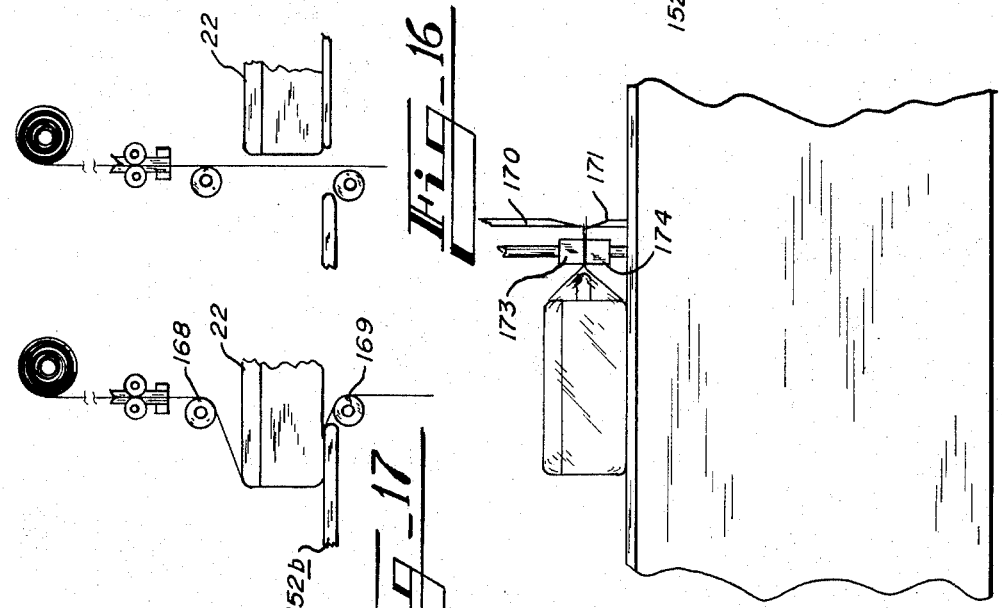

APPARATUS AND METHOD FOR AUTOMATICALLY SIZING AND WRAPPING A SHRINK WRAP ENVELOPE AROUND ADVANCING LUGGAGE

BACKGROUND OF THE INVENTION

1. Field of the Invention

In accordance with the classification of art as established in the United States Patent Office art pertinent to this invention is found in the general class entitled "Package Making" and in the subclasses therein of "methods-by differential stretching or shrinking of cover."

Also pertinent is the art found in the general class of "Foods and Beverages" and the subclass therein of "preservation by hermetic sealing by packaging, wrapping and casing."

2. Background of the Invention

Wrapping of packages with heat shrinkable film is a well known means for protecting the contents of all sorts of products and packages. Pallets with stacked cartons and the like are often shrink-wrapped with film. Foodstuffs such as fruit are also conventionally packaged with a shrink wrapped film cover as are beer, soft drinks, boxes of baked goods and the like which are partially or completely tightly wrapped by heat shrunk film.

The process and apparatus for using infolded tubes, bags and the like are shown in many U.S. and foreign patents, however, insofar as is known, the wrapping of luggage where random sizes, weights and configurations are a constant variable has not heretofore been provided or achieved. In the present invention there is provided an apparatus and modifications thereof and a method for automatically weighing and sizing a randomly advanced piece of luggage and to selectively wrap this luggage member in a film of appropriate thickness and size. This wrap is provided with an integral handle formed in the film which is heat shrunk to form the wrapped package.

Summary of the Invention

This invention may be summarized at least in part with reference to its objects.

It is an object of this invention to provide, and it does provide an apparatus and method which automatically receives, weighs, sizes and transports random sized luggage to and through apparatus which automatically wraps the piece of luggage in a heat shrinkable film, forms a handle in an extending portion of the film and then shrinks the film.

It is a further object of this invention to provide, and it does provide an apparatus and method in which a random piece of luggage is received, weighed, sized and transported to a film wrapping station where films of various thicknesses and widths are stored for selective delivery to a film wrapping station to and through which the piece of luggage is fed. After forward advancement of the luggage piece for a determined distance the film is wrapped and peripherally sealed around the piece of luggage and at this same time a handle is formed in an extending edge portion of the film. The wrapped luggage is now severed from the strip of film. The film wrapped piece of luggage is then heated to heat shrink the film.

The method and apparatus of this invention contemplates that an airline or like public transporting system which by custom or necessity are required to assume responsibility for transporting of a customer's luggage has a centralized classification and receiving means. At this station various pieces of luggage are tagged, weighed and are transported to loading stations. This invention is fitted into this transporting sequence.

The weighing system at the check-in counter is used to feed the information as to the weight of the piece of luggage received. The size of the luggage is determined by an electric eye apparatus after which this luggage piece is fed to a film overwrap station. From film storage stations above and/or below the path of the piece of luggage one or more strips of film are fed to a station where they form a curtain or strip into which the luggage member is fed. After the piece is advanced a determined amount a peripheral heat sealing apparatus causes the film to be sealed around the luggage piece. At this time the surplus film is trimmed and in a trailing portion a slot is made which slot forms a handle when heat sealed. The wrapped luggage is fed to and through a heat shrink apparatus while at the same time the film from the storage supply is rewound on their supply spools.

In all embodiments shown the weighing system at the check in counter is used to feed the information as to the weight of the piece of luggage received. The size of the luggage is determined by automatic means after which this piece is then fed to a film overwrap station. In three of the four embodiments depicted, from film storage stations above and below the path of the piece of luggage strips of film are fed to a heat sealing station where they are sealed to form a curtain or strip into which the luggage member is fed. In a fourth embodiment a plurality of film strips is stored and one strip is advanced to a determined position below a conveyor. This film forms a curtain into which the luggage is advanced. After the piece is advanced a determined amount, as above indicated, in all embodiments a heat sealing apparatus causes the film to be sealed around the luggage piece after which the surplus film is trimmed and an exterior handle is formed. The wrapped luggage is then fed to and through the heat shrink apparatus while at the same time the severed film from the storage supply is rewound on their supply spools. Such an apparatus and method as applied to or contemplated for a luggage wrap is not known to the applicant.

The film supply is shown in four embodiments. All arrangements provide plural widths and thicknesses of film which are selectively fed to sealing means which may be either transverse or longitudinal. All wrapped luggage is enclosed in a tight package with an integral handle for each.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the apparatus and method for shrink wrapping randomly fed luggage. This apparatus and method as adopted for use particularly in airline installations show a preferred means for shrink wrapping the luggage as a part of their luggage transporting system. This specific embodiment and alternate embodiments thereof have been chosen for the purposes of illustration and description as shown in the accompanying drawings wherein:

BRIEF DECSCRIPTION OF THE DRAWINGS

FIG. 1 represents a side view, somewhat schematic, showing an apparatus for encasing luggage as received at an airline counter and the like, this luggage is enclosed in shrink wrap material with each wrap having an integral handle means provided and with each wrapped luggage maintained in a substantially hermetically sealed condition and with this outer film providing a desired protection against damage;

FIG. 3 represents a plan view, partly fragmentary of an alternate embodiment of a luggage wrap apparatus whereby the luggage is automatically segregated as to size and weight after which it is wrapped in shrink wrap film material at one of several transverse stations each having a film which differs from the other as to width and/or thickness;

FIGS. 4A, 4B, 4C and 4D represent fragmentary end views, partly diagrammatic and showing the operational sequence of the apparatus of FIG. 3, this view taken on the line 4—4 and looking in the direction of the arrows;

FIG. 5 represents a fragmentary side view of an alternate apparatus similar to that shown in FIG. 1 but with this film storage carried on upper and lower ferriswheel type indexing devices;

FIG. 6 represents a fragmentary and schematic side view showing a film feeding arrangement adapted to deliver upper and lower selected strips of film from the storage indexing apparatus of FIG. 5, said film being gripped and transported to film joining condition;

FIG. 7 represents a fragmentary and schematic side view showing means for heat sealing together of the upper and lower strip of film after being moved into position as by the apparatus of FIG. 6;

FIG. 8 represents a side view of the diagrammatic and schematic feeding of a piece of luggage into the film after being joined into a curtain strip as in FIG. 7;

FIG. 9 represents a diagrammatic and schematic side view showing the sealing, severing and forming of the film wrap and the providing of a handle aperture in a trailing film portion;

FIG. 10 represents a plan or top view in an enlarged scale and showing more of the detail of the pair of film strip feeding rollers as used with each film of the turrets of FIG. 5;

FIG. 11 represents an end view of the feeding roller assembly of FIG. 10 with the view taken on the line 11—11 thereof and looking in the direction of the arrows;

FIG. 12 represents an exploded partly fragmentary isometric view of the assembly of FIG. 10;

FIG. 13 represents a side view, partly diagrammatic, of yet another alternate embodiment in which a single turret having a plurality of rolls of films selectively feeds one of these films to form a curtain wrap of the luggage;

FIG. 14 represents a side view of the downstream portion of the apparatus of FIG. 13 and showing the luggage in the process of being severed from the strip of film;

FIGS. 15, 16 and 17 represent diagrammatic side views of intermediate steps of wrapping the luggage of FIG. 13.

Figure 1:
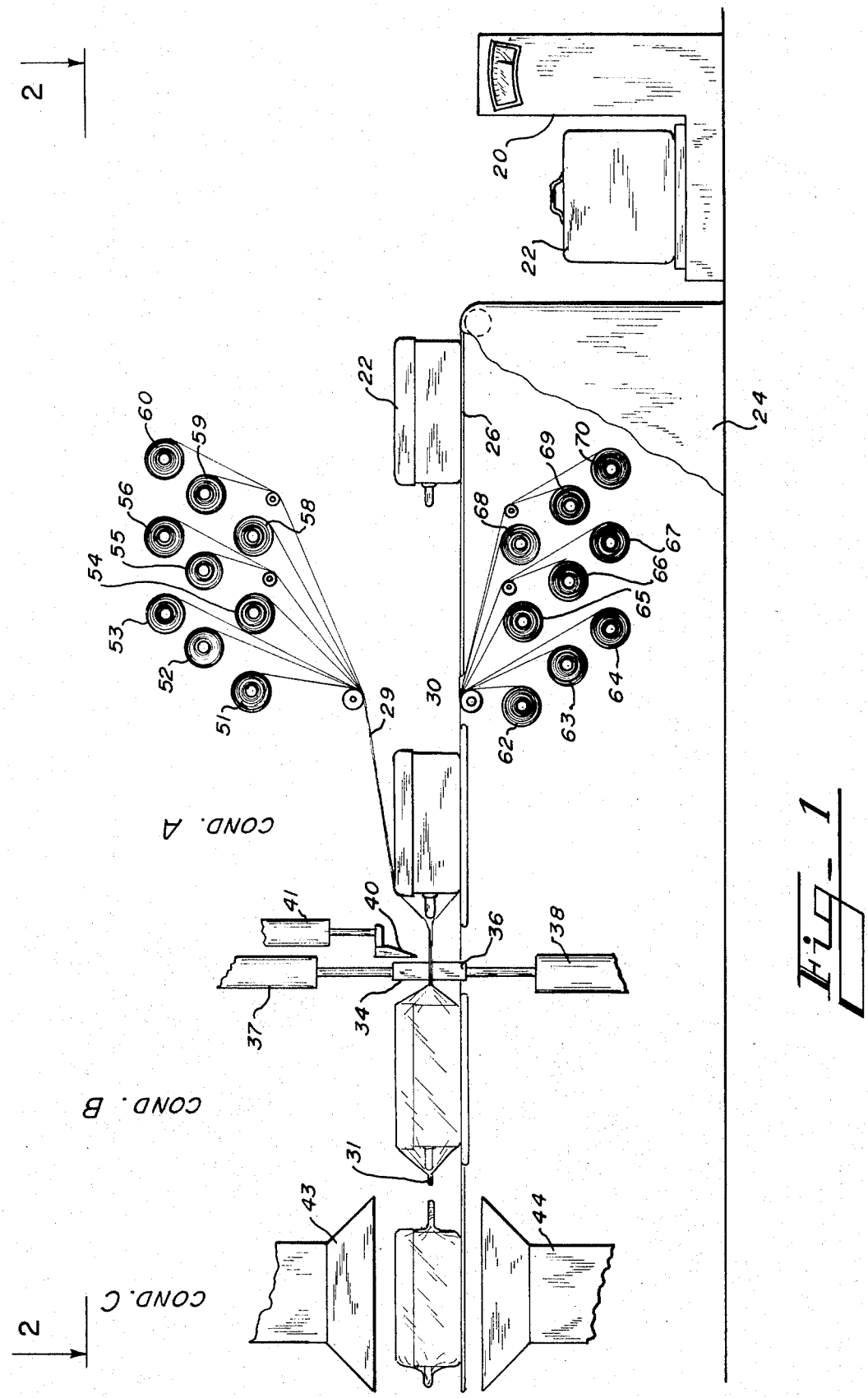

In the following description and in the claims various details will be identified by specific names for convenience. The names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE EMBODIMENT OF FIGS. 1 AND 2

Figure 2:
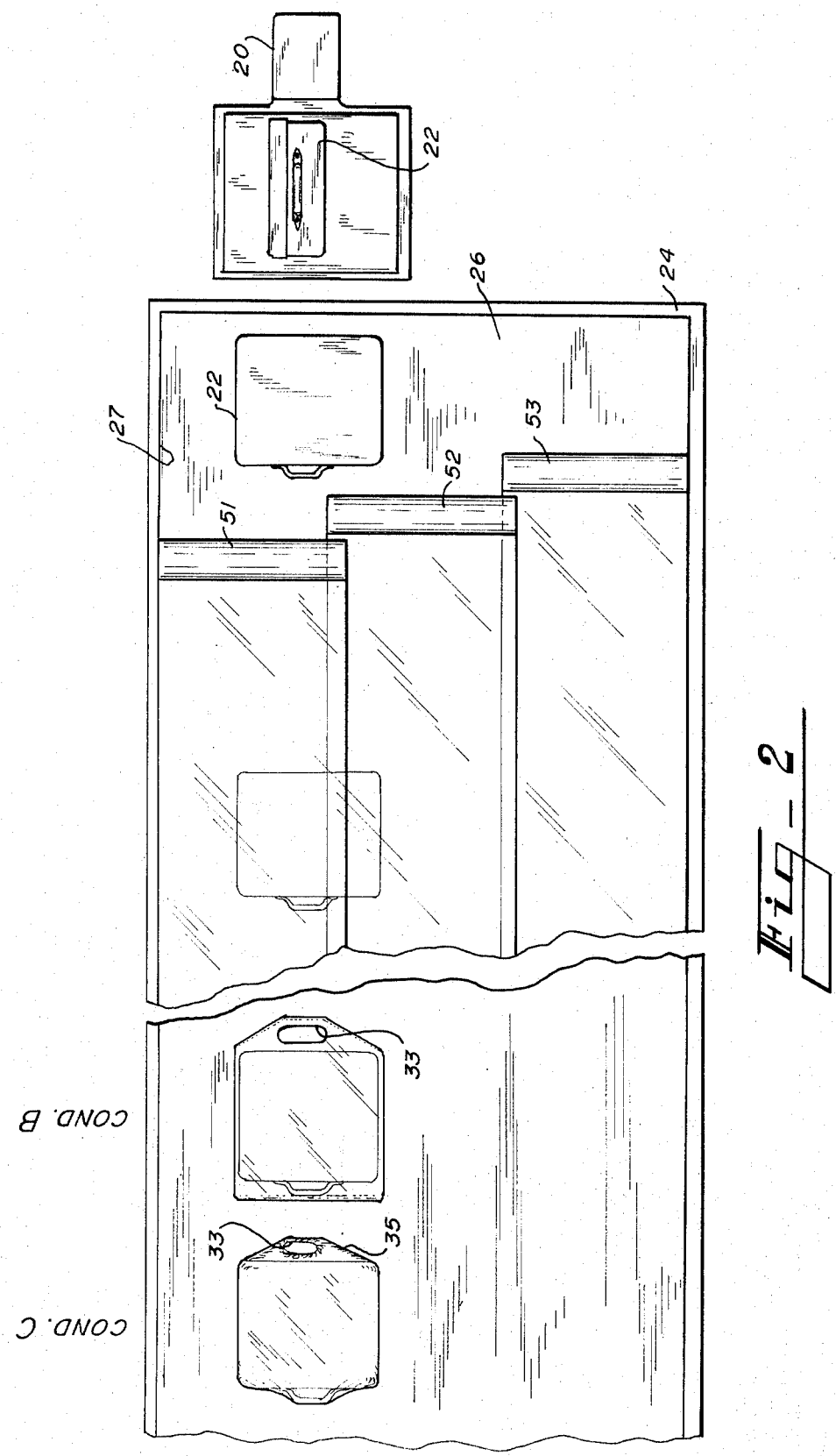
FIG. 2 represents a plan view of the apparatus of FIG. 1 this view taken on the line 2—2 of FIG. 1.

Referring now to the drawings and in particular to FIGS. 1 and 2 there is shown a more-or-less schematic side view of an apparatus for wrapping luggage in a completely enclosed protective shrink wrap film overwrap. As depicted, a scale 20 of conventional design is disposed to weight a piece of luggage 22 when placed upon the scale platform. This scale, in addition to displaying the weight by conventional indicator means, contemplates that this weight result be fed as an electrical signal to a computer mechanism associatively connected to film feeding and selection apparatus. This weight of the luggage as a determined electrical signal is fed to a computing mechanism where an evaluation of the weight is correlated with the size of the luggage. Electric eye mechanisms, well represented in prior art devices and also depicted in FIG. 18, determine the gross width, height and length of the luggage. Means is provided to feed this information as an electrical signal into the computing mechanism so that the thickness and extent of film required to enclose the luggage in an envelope of shrink type film is determined. This computing mechanism is contemplated to be carried in a general base 24 but, of course, may be stored in other places. The electric eye mechanism may be disposed in the face portion of the base 24, the scale and other strategic positions which may include the top of this base.

A conveyor apparatus 26 is carried by the base and is adapted to receive the luggage 22 with the handle laying and directed toward the left which is the direction of travel of the luggage into the wrap mechanism. The attendant in charge of this luggage places the weighed luggage upon the top of conveyor belt 26 which, as shown, travels right to left. At a determined distance in from the upper edge 27 of base 24, as seen in FIG. 2, the piece of luggage 22 is transported forwardly and sends a signal to the computer which by this time will have evaluated the information as to weight and length, width and height of this particular piece of luggage and selected the film to be used as to the weight of the film and the width required to enclose the luggage properly.

Upper and lower films 29 and 30, prior to the arrival of the advancing luggage, have been heat joined at 31 to form a vertical curtain at condition "A" (Cond. A). These upper and lower films may be made of one or more strips of film. As they are fed to the wrapping station they are longitudinally seamed or sealed together by means not shown. The lower film 30 and luggage 22 are carried on the advancing conveyor belt 26 to a position of condition "B" (Cond. B) as seen in FIGS. 1 and 2. At this position the luggage 22 is momentarily slowed or stopped so that the upper and lower films may be sealed around the periphery by conventional heat sealing means. In a trailing portion of these films 29 and 30 a handle aperture 33 is formed by dies 34 and 36 reciprocably actuated by cylinders 37 and 38. At this same time apparatus, not shown, also seals the remaining perimeter of the luggage so that the luggage is completely encased by and in shrink films 29 and 30.

A cutting knife 40 actuated by and carried by a cylinder 41 severs the trailing end portion of the film so that the now sealed luggage may be advanced to condition "C" (Cond. C) which as seen in FIG. 1 includes upper and lower radiant heating members 43 and 44. As depicted in FIG. 2, a handle opening 33 formed in the trailing edge of the films is shrunk by the upper and lower radiant heating elements to cause the severed edge of the film which forms the handle opening 33 to shrink and thicken while the remainder of the shrink film is drawn tightly around the luggage as seen in condition "C" in FIG. 2. At the same time, as the handle opening is moving outwardly from the initially cut opening to form a thickened and rounded edge at the handle aperture, the trailing edge 45 of the upper and lower films is drawn toward the luggage 22 and thickens to provide a substantially stiff and strong rope-like member integral with the shrink wrap film and provides a strength means so that as the luggage is grasped by this separate handle opening 33 and carried to a loading conveyor or placed in the hold of the aircraft this shrunk edge supports the luggage in the film.

As seen particularly in FIG. 1 and only partially in FIG. 2 there is shown the storage of a plurality of rolls of upper and lower shrink wrap film. As depicted, there are nine rolls above and nine rolls below. Each of these rolls are selectively associated with feeding apparatus, not particularly shown in this embodiment but, which are shown in later disclosed and described embodiments. These films are adapted to be selectively fed to a position whereby they may be joined. As seen particularly in the embodiment of FIG. 2 it is contemplated that film strips 51, 52 and 53 may be the same gauge and width of film. From these supply rolls the strips are arranged so as to be fed toward the wrapping station with their edges disposed in an overlapped relationship to that when a received piece of luggage 22 is so large as to require a width greater than that provided by a single width of film, a second or even a third width of film is supplied and joined in an overlapped condition. At the overlapped juncture of any two films there is provided heat sealing apparatus which longitudinally joins, as by a rolling heat sealing apparatus, not shown, the adjacent film strips. After the films are joined together longitudinally they, of course, form a single film which may be two or more rolls wide. Since luggage size limitations are generally established by the air carrier association it is contemplated that the various sizes of luggage contemplated to be wrapped will preferably require no more than three or four full widths of film such as shown as carried by the distributing upper and lower film storage means. At the same time that the computer selects like upper and lower widths of film by the same computing means it also selects the required same thickness of film. After like widths and like thicknesses of upper and lower film are selected the film is fed to an end sealing or joining station where the ends of the upper and lower films are sealed to each other. Into this film curtain the luggage which is to be wrapped is advanced as seen in condition "A," FIG. 1.

The stored upper films, as depicted, have one group which is identified as 51, 52 and 53. The next weight of stored films are depicted as a second group identified as rolls 54, 55 and 56, which rolls may be the same width as the rolls of film 51, 52 and 53. This is not a necessary requirement of the storage of the film rolls since it may be desirable to have the heavier film made in a different width to accommodate larger luggage pieces. Also shown is a third group of three upper film rolls identified as 58, 59 and 60 which rolls are contemplated as providing a heavier gauge of film than the other two gauges of film. It is contemplated that wrapping the presently known luggage with the heaviest required film will use a heat shrink film which may be nine-thousandths of an inch thick. Each of the heavier rolls of film likely will have widths like the rolls of film 50, 51 and 52.

The lower film storage means like the upper film storage which contained prior identified rolls 51-60, includes lower film rolls 62, 63 and 64 which are contemplated to be substantially the same width and thickness as are the films 51, 52 and 53 in the upper storage system. The next group of lower films 65, 66 and 67 are contemplated to be substantially the same thickness and width as the upper roll stored films 54, 55 and 56. The last depicted group of lower films 68, 69 and 70 is the heaviest gauge and the width is contemplated to be the same as that of the corresponding upper rolls of heavy films 58, 59 and 60. The lower film like the upper film or films are selected by the computer and by appropriate apparatus are fed toward the conveyor. These selections accommodate both the width and thickness of film necessary to encase and protect the luggage member 22 with the film corresponding to the size and weight of the luggage 22 that is to be fed through the depicted shrink wrapping apparatus.

It is to be noted that in FIG. 2 the luggage is shown as being of rather small size when laid on the full width of the conveyor 24. This conveyor width is disposed to accommodate luggage which may be as much as three times the width of the luggage depicted. The width of accommodation by the conveyor is determined by the predetermined maximum size of the luggage to be wrapped. The conveyor carrying capacity and the maximum thickness of the film to be supplied is also established by this same maximum limitation. Not shown in FIGS. 1 and 2, but obviously an important consideration in the function and operation of the apparatus, is a peripheral heat sealing means that is supplied and is of conventional design. This sealing apparatus is automatically adjusted by means of information secured by electric eye systems both as to the original size reading of the luggage and also by the positioning of the luggage 22 on the conveyor 24. The peripheral sealing means insures that when the upper and lower films are heat sealed to each other and around the luggage the luggage member is completely enclosed and sealed, the film having a determined spacing or slackness from the outer shell of the luggage. When the shrinking of the film is accomplished the handle opening 33 formed therein will result in the desired tightness of wrap and provide a satisfactory handle lifting means.

USE AND OPERATION

It is contemplated that when the attendant receives a piece of luggage 22 he will place it upon a scale 20 which will then weigh the luggage and automatically feed this information into a computer which is a basic component of the high speed shrink wrap system. At the same time, or immediately after this luggage is weighed, appropriately spaced electric eye systems measure the gross overall size of the luggage member as to its width, length and height. This information is also fed to the same computer which automatically selects a weight and necessary gross width of film within which this particular piece of luggage is to be encased and shrink wrapped. The selected films are then fed through feeding apparatus to a curtain heat sealing mechanism. For example, assuming that the upper and lower strips of film require a film two rolls wide and that the gauge of film selected falls within the middle weight of the film roll storage, as the weighed luggage 22 is advanced on the conveyor 24 a strip of film from upper storage rolls 54 and 55 and lower rolls 64 and 65 are automatically fed forward with conventional longitudinal sealing means, not shown, joining the two upper film strips into one strip. The lower film from rolls 64 and 65 are joined in a like manner. The two overlapping and sealed strips forming upper and lower strips are fed to and past each other. The ends of these strips are joined by sealing to each other by apparatus similar to, if not identical to, that to be hereinafter described. This luggage 22 carried by conveyor 26 is then brought in way of this sealed curtain edge and is moved forward with a continuous advance. The lower strip of film 30 is carried on the conveyor and the upper film 29 is guided into a position corresponding to condition A. After the luggage has been moved forwardly from condition A to condition B the peripheral area along the sides and along the back of the luggage is sealed by heat sealing means to form a continuous peripheral seal around the luggage, the seal usually leaving a small bit of space between the outer surface of the luggage and the sealed film. At the same time and after the rear sealing adjacent the luggage is accomplished, the contouring mechanism which includes the dies 34 and 36 are actuated by cylinders 37 and 38 to seal the trailing edge of the wrap film and to sever the upper and lower film strips 29 and 30 for rerolling to their storage condition. Handle aperture 33 is formed in the extending tab piece of the upper and lower film. As seen in FIG. 2 this punched aperture is positioned and shaped so that there is a substantial portion of film around the aperture. The rear of the film is severed by knife 40 actuated by cylinder 41. The film is cut in a diagonal line and provides a sufficient amount of exposed film so that when the heat shrinking operation is performed a rope edge 35 is formed along this trailing edge of the film. This heat shrinking of film occurs when the loosely wrapped luggage 22 is moved forward to condition C and in way of the upper and lower reflecting or radiating type heating apparatus 43 and 44. The reflector apparatus may be fixed or movable depending on the desired installation. A brief exposure to the radiant heat from these units causes the film to be heat shrunk to a tight fit around the luggage with the handle portion shrunk to a thickened condition enabling the baggage handler to grasp the wrapped luggage member by this handle and lift the luggage.

Although depicted as having the handle portion 33 formed in the trailing edge of the film and opposite the handle of the luggage this is not necessarily a requirement since the regular handle portion of the luggage may be placed anywhere including at the trailing end. Some contoured shapes of the luggage may make it desirable that the handle may be placed at the side or top of the heat shrunk luggage. The positioning of the luggage on the delivery conveyor from which it is to be grasped determines the handle 33 which after delivery to the end of the conveyor is placed upon a delivery rack for transport to the aircraft.

ALTERNATE EMBODIMENT AS SHOWN IN FIGS. 3 AND 4

Referring now in particular to FIGS. 3 and 4 an alternate embodiment is depicted. Instead of the plurality of rolls of film which are grouped as to like weights and widths as in FIG. 1 this embodiment uses a plurality of upper and lower rolls of film having different widths and thicknesses. These rolls, both upper and lower, are shown as arranged in a side-by-side condition and as such provide a large variety of options as to the selection of film widths and thicknesses. This arrangement simplifies to a great extent the mechanism necessary to select and advance the film since these films are initially heat sealed to join the upper and lower rolls and form a curtain. After this initial sealing action has been accomplished the curtain seal is continued and is maintained from the wrapping of one piece of luggage to the next luggage member fed to this station until the upper and lower films have been exhausted from the respective rolls.

Figure 18:
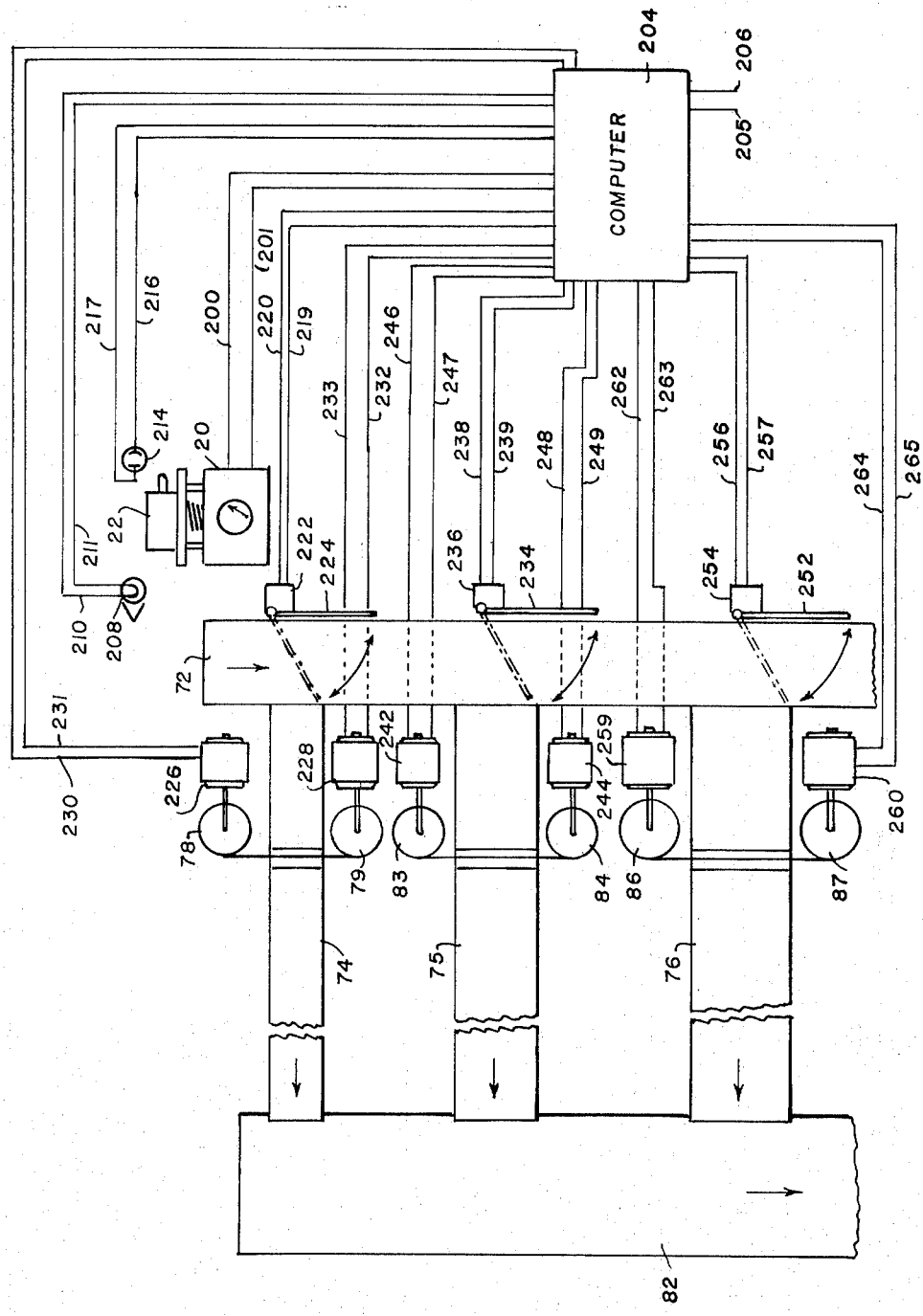
FIG. 18 represents a schematic diagram of the apparatus of FIG. 3 and shows the relationship of the several actions to a computer control of the apparatus.

As in FIG. 1 this embodiment utilizes a scale 20 disposed to receive and weigh a luggage member 22. This scale is adjacent a transporting conveyor mechanism 72 carried by a base 73. This conveyor and base is preferably adjacent the luggage weighing platform to provide easy access for the attendant. Conveyor 72 travels from right to left at a determined speed and upon this conveyor belt the attendant places the luggage 22 after weighing. A computer, not shown, like that used in FIGS. 1 and 2 accepts the weight information and by means of an electric eye measuring system the luggage member is grossly measured as to height, length and width. After being placed on conveyor 72 this luggage travels leftwardly until it reaches a computer actuated deflector which halts the forward travel of the luggage member. This deflector, like others along the conveyor may be a plow arm pivotally mounted so as to be selectively swung into the and from the path of the leftwardly traveling luggage. These deflectors are selectively actuated by mechanism, as depicted in FIG. 18 and are moved to determined limits, in response to a command from the computer system. The luggage member deflected from conveyor 72, as depicted, is deflected to one of three transverse conveyors 74, 75 and 76 by one of the deflectors shown in phantom outline. Upon one of these three transverse conveyors the luggage to be wrapped is fed to and between upper and lower films. As identified, the first station from the right hand end of base 73 is disposed to feed upper and lower films 78 and 79 which are of like thickness and width and accommodate luggage of the light weight and smaller size limitation. The feeding of the luggage is toward and to the curtain provided by the joined upper and lower films. As the luggage is advanced the upper and lower films are brought to and around the luggage as seen in FIG. 4A. The luggage member continues to station FIG. 4B where the upper and lower films are pressed together and are heat sealed at the back and along the sides such as seen in condition B in FIG. 2. After, or at the completion of the peripheral sealing and trailing edge trimming by knives 80 and 81, the handle hole 33 is formed and the film is severed, however, in this embodiment it is contemplated that where and when the upper and lower films are severed from the wrapped luggage they are also sealed or joined transversely of the film to retain the film as a curtain member extending from the upper to the lower film roll member. After the luggage has been wrapped as in FIG. 4B it is then delivered onto the longitudinal conveyor 82 on the upper side of FIG. 3 and is fed to a heat shrink station, FIG. 4C, which may have radiant heaters 43 and 44 such as depicted in FIG. 1, whereupon the film around the luggage is heat shrunk to provide the resultant wrapped luggage as seen at condition C in FIG. 2. Delivery conveyor 82 then transports the wrapped luggage to a receiving station from which it may be placed upon a truck or the like and delivered to the waiting aircraft.

If the weight and the size of the luggage is heavier or larger than the above-described smaller piece of luggage, which is identified as 22a on conveyor 74, this heavier luggage 22b is carried by the conveyor 72 to a deflector or redirecting means such as the plow arm seen in phantom outline by which it is removed to conveyor 75. Luggage 22b is then fed into a film curtain consisting of and extending between upper and lower films 83 and 84 which are wider than the films 78 and 79 and have a heavier thickness. The film which is to encase the luggage 22b is brought to and through a wrapping procedure as in FIG. 4A, B and to FIG. 4C. The finally wrapped and heat shrunk member 22b is delivered to and by conveyor 82 to the end of this conveyor in the same manner as wrapped luggage 22a of a smaller size.

When the luggage member 22 is even larger in size or weight, or both, it is fed to yet another station where another deflector such as that shown in phantom outline guides the luggage from conveyor 72 to conveyor 76. As depicted this is the third station which has upper and lower films 86 and 87 which as a joined curtain receive the luggage 22c after being deflected from conveyor 72 to conveyor 76. By means of apparatus as shown in FIGS. 4A, B, C and D the luggage 22c is encased, sealed in shrink wrap film and after severing and heating to shrink wrap the film is delivered to the conveyor 82 for delivery to the receiving station at the far or left end of the conveyor.

USE AND OPERATION OF THE APPARATUS OF FIG. 3

As depicted in FIG. 18, the luggage 22 when placed on the scale 20 feeds an electrical signal through conductors 200 and 201 to a computer 204. This computer is powered by current fed to it by leads 205 and 206. This current is also used to actuate and power other operations. As the luggage 22 is weighed, or at another later station, one or more electric eye systems employing a directed light source 208 supplied by electric current through leads 210 and 211 uses this beam of light to actuate an electric eye 214. Signals from electric eye 214 is fed by conductors 216 and 217 to computer 204 which evaluates this information to select the conveyor on which the weighed and sized luggage will be fed to a wrapping station.

For example, if the computer has determined that size and weight of the luggage 22a can be satisfactorily wrapped in the film used with conveyor 74 an approximate signal and power is sent through conductors 219 and 220 to an actuator 222 which moves deflector 224 clockwise to the diagonal condition shown in phantom outline. Rolls 78 and 79 driven respectively by motors 226 and 228 are advanced or reversed in accordance with electrical signals and power carried through conductors 230, 231, 232 and 233 and sent from computer 204. After the luggage 22a has been delivered to conveyor 74 the deflector 224 is moved to its position adjacent the right side of conveyor 72.

Assuming that the computer 204 has determined that the luggage piece is heavier and/or larger than is to be accommodated on the arrangement with conveyor 74 the deflector 224 remains in the non-deflecting position and deflector 234 in response to signals and power from computer 204 is moved clockwise to the deflecting position of the phantom outline. Actuator 236 which moves deflector 234 receives its signals through conductors 238 and 239. As and when the luggage 22b is received by conveyor 75 the rolls 83 and 84 are advanced or retarded by motors 242 and 244. These motors are driven by current and signals from the computer 204 carried by conductors 246, 247, 248 and 249. After the luggage 22b has been delivered to conveyor 75 the deflector 234 is moved to its position adjacent the right side of conveyor 72.

When the computer 204 has determined that the luggage 22c is heavier and/or larger than is to be accommodated on the arrangement with conveyor 75 the deflectors 224 and 234 are retained in the non-deflecting position and deflector 252 in response to signals and power from the computer 204 is moved clockwise to the deflecting position of the phantom outline. Actuator 254 which moves deflector 252 receives its signals from computer 204 through conductors 256 and 257. As and when the luggage 22c is received by conveyor 76 the rolls 86 and 87 are advanced or retarded by motors 259 and 260. These motors are driven by current and signals from the computer 204 carried by conductors 262, 263, 264 and 265. After the luggage 22c has been delivered to conveyor 76 the deflector 252 is moved to its position adjacent the right side of conveyor 72. If conveyor 76 is the last transverse conveyor the deflector 252 may be left in deflecting position. Further stations may, of course, be provided.

As in the apparatus of FIGS. 1 and 2 the luggage 22 is placed upon the scale 20 and by means of electric eye 214 or like measuring means the luggage member is weighed and measured as to gross size with this information being fed to a computer and associated actuating apparatus. The weight and size factors are analyzed while the luggage member 22 is lifted by the attendant onto conveyor 72. The luggage is moved along this conveyor until deflected to one of the conveyors 74, 75 or 76. For each transverse conveyor a deflector means is provided. Whether a pivoted plow arm, a pusher plate actuated by an air cylinder or other transfer means, the deflector is considered merely a matter of conventional expediency and design. Many factors will guide and determine the selection of the deflector apparatus, among these factors being cost, mode of actuation and strength factors. If additional width or thickness selections are necessary, further stations to accommodate these larger types of luggage may be provided. The attendant having placed the luggage upon the scale 20 and thence on the conveyor 72 is relieved of further attention since the luggage traveling along this conveyor is engaged by the deflecting means actuated by the computer. The deflected luggage is fed to a conveyor adapted to feed this particular luggage to a particular film selected as to thickness and width which the computer by previously stored information has determined is necessary to protect this luggage with a desired thickness of heat shrink film.

It is to be noted that in the enlarged views of FIGS. 4A, 4B, 4C and 4D the handle 88 on the luggage is shown as being on the trailing side of the advancing member. This is done so as to demonstrate that the handle 88 may be positioned as desired by the attendant at the scale. In other words, the handle 33 placement formed in the shrink wrap is preferably in a tailing web portion of the film. The placement of the luggage handle 88, where and when there is one attached to the luggage, is merely a matter of attendant selection.

DESCRIPTION OF THE ALTERNATE EMBODIMENT

AS DEPICTED IN FIGS. 5-12

Referring next to the drawings and FIGS. 5 through 12 there is shown yet another arrangement in which the upper and lower supply of film is each stored in and on a rotating turret. A base 100 carries a conveyor 102 which is adapted to receive luggage member 22 and after weighing and sizing the luggage, as in FIG. 1, the luggage is placed on conveyor 102 and advanced between upper and lower films 104 and 106 which are selectively advanced to joining means to form a film curtain. These upper and lower films are carried by upper, lower, rotating turrets 108 and 110 which are rotated by apparatus not shown. The turrets, here depicted, each have eight rolls of film contemplated to be of varying widths and thicknesses and carried so as to be individually fed to transport and sealing mechanism to be hereinafter more fully described.

The upper and lower films are carried by upper and lower turrets 108 and 110 which are rotated to a desired station or position by apparatus not shown. As depicted, both turrets carry eight rolls of film, which rolls are contemplated to be of varying widths and thicknesses to give a full range of width and thickness combinations. The upper and lower turrets each have like rolls of film which correspond to like widths and thicknesses as carried by and on the other turret. The upper film rolls for convenience are indicated as 104 a, b, c, d, e, f, g and h. The lower rolls for convenience are identified as 106 a, b, c, d, e, f, g. and h. The placing of the luggage member 22 upon conveyor member 102a will either start this conveyor moving and/or with the conveyor already moving will at the same time cause the upper and lower turrets to be rotated to bring like upper and lower rolls of films such as, for example, 104a and 106a to a film delivery condition. It is to be noted that on the upper and lower turrets each film is fed and retained by means of a film feeding mechanism generally identified as 114 and to be hereinafter more fully described. The selected weight and width rolls of upper and lower films 104 and 106, after positioning, are fed to a gripping and transferring means by which they are brought in way of a joining apparatus. This apparatus which may be a heat sealing unit joins the ends of the upper and lower film to form a curtain such as seen in condition A in FIG. 1. Into this curtain the luggage 22 is fed leftwardly to and in way of peripheral sealing apparatus to encase the luggage in a film envelope. This wrapped luggage is then fed to a station comparable to condition B of FIG. 1. This is also identified as condition B on FIG. 5 wherein the upper and lower films 104 and 106 are trimmed at their trailing edge by means of knives 116 and 117 and by means of dies 118 and 119 and the handle cutout portion 33 is formed in the trailing portion of film. It is contemplated that the eight rolls of film carried on the upper and lower turrets will have sufficient widths and thicknesses to provide the range needed to accommodate the wrapping requirements of the several luggage sizes and weights. However, the number of rolls of film shown on the turret is merely a matter of selection since turrets 108 and 110 may be built to accommodate whatever number of rolls of film are deemed necessary.

Referring now to FIG. 6 it is to be noted that upper film 104 and lower film 106 are respectively carried by the turrets 108 and 110. From the selected rolls each of the upper and lower films are advanced by the film feeding apparatus 114 and after a short length of film has been fed therethrough an upper gripping and transfer mechanism indicated as clamp means 120 is brought to and below the level of conveyor 102. At the same time that the upper film 104 is being fed and advanced the lower film 106 has been fed by a like feeding mechanism 114 to and in way of a lower clamp means 122 which grips the film 106 and directs it around deflecting roller 123 and thence upwardly to bring the end of film 106 to and past the upper film clamp mechanism 120.

Referring next to FIG. 7 it is to be noted that the lower film and transfer jaws 122 have carried the end of lower film 106 to and above the top of conveyor 102 and base 100. At the same time the upper film clamp and advancing mechanism 120 has brought the end of film 104 downwardly to and past the top of base 100 and conveyor 102 at which time and after which arcuately moved heat sealing members 124 and 125 have been swung into position to press the ends of the films 104 and 106 together and by means of the heat sealing tips these films are joined to form a vertical curtain film. The clamp jaws 120 and 122 are only figuratively shown The many satisfactory designs well known to the film industry may be used. Rubber faced jaws actuated by air cylinders are only one of many well known clamping systems. The heat sealing members 124 and 125 in a like manner may transcribe an arcuate path by one of many conventional designs. The members 124 and 125 may, for example, be pivotally supported, or may be carried in curved tracks or the like. Pneumatic, hydraulic or electrical power means may be used where desired.

Referring next to FIG. 8, after the upper and lower films have been joined and the heat sealing mechanisms 124 and 125 have been returned to their repose position, the luggage 22 is advanced into the film which by means of adjusting rollers 126 and 127 guide and direct the films 104 and 106 around the advancing luggage 22.

Referring next to FIG. 9 it is assumed that the luggage 22 has been advanced to and past a sealing station at which time the upper and lower films have been peripherally sealed around the luggage and by means of knives 116 and 117 the trailing portions of the film have been cut to separate the strips of upper and lower films 104 and 106 which are then rerolled on their storage rolls with the ends at a determined position substantially at the end of their own film feeding mechanism 114 as seen in FIG. 6. The handle forming dies 118 and 119 have cut the handle opening or aperture 33 in the retained trailing portion of the film after which the wrapped luggage is advanced and heat shrunk in the manner depicted in FIG. 2 at condition C.

FILM ADVANCING MECHANISM AS SEEN IN FIGS. 10, 11 AND 12

Depicted in FIGS. 10, 11 and 12 is the film advancing mechanism as generally designated 114 in FIGS. 5 and 6. On mandrels or shafts 130 and 131 are carried or formed like roller sections 133 and 134 which are contemplated to be of the same diameter and are preferably resilient covered or have resilient face means disposed to grip the film when it is brought to and between these roller sections. The rollers on each of these shafts are spaced so as to provide entry ways which in the present instance are occupied by opposed guide fingers 136 and 137. A guide finger is disposed in the space between each of the guide rollers 133 and 134 and provides one side of a slide path and guide for either an upper or lower film fed therebetween. These guide fingers are secured to and retained in position by support bars 138 and 139. The guide fingers 136 and 137 are maintained in a desired spaced relationship between the roller sections 133 and 134 so as to insure that the film strip passing therebetween is in a flat guide path. Mandrels or shafts 130 and 131 are connected to meshed drive means which are rotated to cause the film to move in either a forward or reverse direction. The strip of film gripped by these rollers is thus advanced or retracted to a determined storage position.

USE AND OPERATION OF THE APPARATUS OF THE ADVANCING MEANS OF FIGS. 10 THRU 12

After and when the turrets 108 and 110 are rotated to the determined position to bring one of the rolls of film whose weight and width has been selected by the computer the drives of the roll containing this film are released to the extent that the drive rollers 133 and 134 of advancing mechanism 114 are rotated in a determined direction to feed the film to and between the appropriate gripping bar mechanisms as depicted in FIG. 6. These films are joined to form a curtain into which the luggage 22 is advanced. The upper and lower films are fed to a determined length which is sufficient to allow these upper and lower films to be drawn to and sealed around the luggage 22 to the extent seen in FIG. 9, after which the upper and lower knives 116 and 177 cut the film 104 and 106 to sever them from the wrapped luggage. At this time the rollers 133 and 134 or the roll support mechanism are reversed to draw the severed film strip back to the end of and into the retaining guides 136 and 137. The rotation of the rolls of film 104 and 106 is stopped to bring the film to a repose condition until next required. The next luggage may require the same film size and weight in which case the same rolls of films are again delivered to repeat the above procedure. When a different width and/or thickness of film is required then the turrets are rotated to bring the new required roll of upper and lower film to and in way of the gripping jaws 120 and 122 for a repeat of the action.

SINGLE FILM WRAP OF FIGS. 13 THRU 17

Referring finally to the apparatus as depicted in FIGS. 13 thru 17 it is to be noted that instead of upper and lower films, as shown in the above embodiments, a single film is used in this embodiment to wrap the luggage 22. A base 150 carries conveyors 152a and 152b which are disposed to receive luggage 22 after weighing and measuring in the manner shown and described in FIGS. 1, 3 and 5. A turret 154 carries a plurality of rolls 155, each roll having a film of a different weight or width or both. This turret is rotated in response to a computer actuation which is similar to that previously described in the above embodiments. Guides 157 are carried on the turret 154 and are provided for each film so as to retain the film in a determined attitude and to insure that its film strip is retained in a desired position and condition during turret rotation. When a film roll has been brought to a discharge condition it is fed to a film feeding apparatus 114 like that described in FIGS. 10, 11 and 12 above. Between the forward and rearward conveyor sections 152a and 152b there is provided a space into base 150. In this base and below the conveyor is mounted a measuring means. This detection and measuring system is disposed to receive the downwardly advancing end of film 155 as seen in FIG. 15. With the desired computation as to weight and size of film the computer also determines the length of film 155 necessary to wrap luggage 22. This amount is fed to and through apparatus 114 and extends downwardly into base 150 and in way of a sensing mechanism. As depicted, this mechanism includes an air jet manifold 160 having a plurality of nozzles or jets 162 disposed in way of a receiving member 164. This member has a plurality of complementarily positioned apertures 166 formed therein. A signal from this sensing mechanism is sent to the computer which has determined the width and thickness of film and also the amount of film necessary to wrap the luggage 22 in a desired manner. This sensing means sends a signal to the computer which stops the film advance at a determined length.

Turret 154 having previously been rotated to bring the desired roll of film 155 to a feeding condition is retained in this position as the end of this film is fed to a determined extent into the end sensing means. This extent is a determined distance below the conveyor 152 upon which is advanced the luggage 22 to be wrapped. The sensing mechanism which may be an air system or an electric eye system is now deactivated after the determined length of film has been fed downwardly as in FIG. 15. The arrival of the luggage 22 into the film 155 as in FIG. 16 causes the lower extent of film to be retained on conveyor 152b by the weight of the luggage 22. As this luggage is advanced forwardly at the same forward rate the film 155 is also fed from the storage roll to and around deflector roll 168 as the conveyor 152b moves forward. After the conveyor has carried luggage 22 to a determined position it is stopped to permit peripheral sealing of the film to encase the luggage 22 after which the surplus trailing portion of the lower extent of film and the upper film 155 is cut by means of knives 170 and 171. The handle aperture 33 is formed in a trailing film portion by upper and lower dies 173 and 174.

USE AND OPERATION OF THE APPARATUS OF FIGS. 13 THRU 17

Referring to the apparatus as seen in FIGS. 13 thru 17 the luggage 22 after having been weighed and grossly sized by mechanism in the manner of the apparatus previously described for two films, the luggage 22 is laid upon the conveyor 152a for advancement into the wrapping mechanism. At this same time the turret 154, if required, has been rotated by computer responsive mechanism to cause one of the rolls of film 155 to be selected as to its thickness and width. The end of this film is fed from the roll to and between the film advancing mechanism 114 as seen in FIG. 15. The amount of film necessary to cover the bottom and trailing portion of the film wrap is fed to and between the lengths sensing mechanism composed of front and rear members 160 and 164. When a pneumatic sensing device is used the jets 162 will cooperate with the receiving apertures 166 to indicate the amount of film delivered into the sensing device. After the amount of film necessary to cover the bottom and a portion of the front and rear of the luggage has been fed, the luggage 22 as in FIGS. 16 and 17 is brought to and into the single film drape. The advancing luggage passes between upper and lower guide rollers 168 and 169 with the luggage 22 traveling forwardly on conveyor 152b, particularly as seen in FIG. 13. After the luggage has been advanced to a determined position it is stopped while and as peripheral sealing bars, not shown, seal the luggage 22 in the overwrapped film. After sealing the wrapped luggage is advanced to the handle forming dies 173 and 174 which will form handle aperture 33 in the trailing film portion and the knives 170 and 171 will sever the film to form a determined trailing portion design and also cut the upper film 155 from the wrapped luggage. This film is then rerolled onto the roll to a position which is substantially at or between the guides 157.

In this embodiment, like the other described embodiments, the placing of the luggage handle in the overwrapped film encasement is merely a matter of selection. The heat shrinking mechanism may be any of the conventionally known methods or ones yet to be devised. The computer selects the weight and width of film which is carried by one of the rolls 155 on turret 154. The amount of film delivered below conveyor 152 is equal to the bottom extent of luggage 22 plus whatever is necessary to provide the bottom film portion of the rear or trailing portion of the film wrap. For example, if the front to back extent of luggage 22 on conveyor 152b is 20 inches and the bottom film portion necessary to form the back wrap and handle flat portion is 10 inches, then the computer will cause 30 inches of film to be fed below the top of conveyor 152b.

The several embodiments contemplate that preferably one thickness of film is used to encase the luggage and one handle 33 is formed in each shrink wrap member. It is, of course, realized that double or even triple thickness of film could be used and that more than one handle 33 could be formed in extending extents of films. The concepts above shown contemplate such obvious modifications by addition.

In the apparatus of FIGS. 1 and 5 it is contemplated that the front seam is the same as the joining to form a curtain. In FIG. 13 there is no front seam. In these embodiments after peripheral sealing the film strips are severed and rerolled to their storage condition. In the apparatus of FIG. 1 the longitudinal seaming is discontinued so that when the trailing portion is severed the film strips may be rerolled onto their several storage rolls. In the apparatus of FIG. 3 when the upper and lower films are joined to form a curtain, the apparatus includes means to seal the upper and lower films subsequent to the severing line thus providing a curtain for a later luggage.

Each of the above embodiments has certain disadvantages tending to made each installation a special affair to accommodate speed, size of and weight limits of luggage and installation requirements. Either as shown or with modifications the principle of shrink wrapping each individual piece of luggage as a handled unit is provided in the above embodiments.

It is, of course, to be noted that the shrink wrap film is usually naturally transparent so that the destination tag may be attached to the handle and seen therethrough. The destination tag also may have a light adhesive or self-sticking adhesive so that the tag may be atached to the side of the luggage with the destination indicated on the tag readily visible and yet protected until the shrink film has been removed from the luggage at its destination.

The advantages of the shrink wrapping of luggage in addition to preventing scratches and other damage also protects against entrance of water, moisture and the opening of the luggage for pilferage and the like. The obvious advantages of shipping the luggage overseas with the luggage pre-inspected at customs is, of course, obvious. Such packaging eliminates much of the present hazard of aircraft hijacking wherein metal pieces such as guns and the like are secreted in the luggage after the luggage has been initially passed through an inspection.

Terms such as "left," "right," "up, "down," "bottom," "top," "front," "back," "in," "out," "clockwise," "counterclockwise" and the like are applicable to the embodiments shown and described in conjunction with the drawings. These terms are merely for the purposes of description and do not necessarily apply to the position in which the luggage shrink wrap apparatus may be constructed or used.

While a particular embodiment of the wrapping apparatus and alternate embodiments have been shown and described it is to be understood the invention is not limited thereto and protection is sought to the broadest extent the prior art allows.

What is claimed is:

1. Apparatus for automatically sizing and at a later wrapping station forming a selected shrink wrap film envelope around a package such as a luggage member and then sealing and shrinking the film to protectively wrap the luggage member, the selection of the proper film thickness resulting from weighing the lugage member on a computing scale and then with an electric eye sensing system grossly measuring the height, width and length of the luggage member as a conveyor advances said luggage member toward a wrapping station, during this time a computer receives said information pertaining to the weight and gross size of the luggage member and after evaluation of this information feeds functional signals to the wrapping apparatus station whereat there is maintained a storage supply of shrink wrap film containing a plurality of film strips of various weights and thicknesses and from this storage supply a signal from the computer causes apparatus to be actuated and at least one selected film to be fed to the wrapping station, the luggage wrapping apparatus including: (a) means for engaging the selected film and moving this film as a strip to the wrapping station to form a curtain; (b) a conveyor adapted to advance the luggage member into said film to form a lower extent of film and to drape an upper extent of film over the advancing luggage member; (c) means for heat sealing the upper and lower extents of film to each other to peripherally seal the film and form an encasing envelope of film around the luggage member; (d) means for servering the encased luggage member from the strip of film extending from the storage supply, said severing occurring at a determined distance from the sealed envelope, the severing means providing an extending web portion, and (e) means for forming a handle aperture in said extending portion so that when the encasing film and extending web portion is heat shrunk the extending web and handle aperture thickens to provide a support and handle means.

2. Apparatus for automatically wrapping a package as in claim 1 in which the film storage of the shrink wrap film includes a multiplicity of rolls of film carried adjacent a transport carrier of the package, the film rolls being positioned and grouped so that in response to a computer signal one, two and more like weight films may be simultaneously fed from said rolls to longitudinal sealing means to form a film strip of selected weight and width to provide the desired width film curtain at the wrapping station.

3. Apparatus for automatically wrapping a package as in claim 2 in which substantially like rolls of film are disposed above and below the transport carrier so that like widths and thicknesses of film may be selected to provide like upper and lower extents and weights of film.

4. Apparatus for automatically wrapping a package as in claim 3 in which the means for engaging the film includes gripping jaws which engage upper and lower films and bring them to an overlapped condition and in way of a sealing means which heat seals the ends of the film to form a curtain.

5. Apparatus for automatically wrapping a package as in claim 1 in which the extending portion is the trailing web portion is cut to form a triangular form with the apex of the form extending rearwardly and substantially midway of the trailing edge and with the handle aperture formed in the larger web portion.

6. Apparatus for automatically wrapping a package as in claim 1 in which the means for advancing the luggage member further includes a first conveyor disposed to receive and transport the just weighed luggage member; a plurality of conveyors transversely disposed to the first conveyor with each transverse conveyor disposed to receive a luggage member when deflected from the first conveyor, said transverse conveyor transporting the luggage member to discharge conveyor; a deflector means associated with each transverse conveyor, said deflector means in response to a signal from the computer actuated to dislodge a luggage member from the first conveyor toward and onto said transverse conveyor and in which the like upper and lower films are joined to form a curtain at the wrapping station, the films which are associated with one transverse conveyor being different from another as to weight, width and combinations thereof.

7. Apparatus for automatically wrapping a package as in claim 6 in which each transverse conveyor has an upper and a lower roll of film which are of like weight and width with the films fed toward the conveyor and joined to form an initial curtain, and in which the means for sealing the films around the luggage member includes an additional sealing means adapted to form a second seal disposed to join the upper and lower films at a position toward the film rolls, and in which the severing means is positioned and adapted to cut the films between the envelope forming seal and the second seal with the second seal providing the curtain forming means for the following luggage member carried by this transverse conveyor.

8. Apparatus for automatically wrapping a package as in claim 1 in which a storage supply includes rolls of film carried on a rotary turret selectively movable to a delivery position above a luggage supporting conveyor and the film advancing mechanism includes a pair of substantially parallelly arranged mandrels having like diameter roller sections, each section having peripheral film engaging surfaces, the roller sections spaced so as to grip the film and advance and retract the film when the film is brought between the roller sections which are counter rotated by a drive means connected to the mandrels, the gripped film being maintained in a guided plane through the rollers by means of retained guide fingers positioned between the roller sections.

9. Apparatus for automatically wrapping a package as in claim 8 in which there is provided a film end sensing means, which means is positioned below the luggage supporting conveyor, the end sensing means in response to a signal from the computer stopping the advance of a film of selected width and thickness to provide a curtain whose extent below the conveyor is sufficient to provide a film cover for the lower portion of the luggage member and provide an extending portion for joining with the upper extent of film and forming the sealed film envelope around the luggage member.

10. Apparatus for automatically wrapping a package as in claim 9 in which the film end sensing means is a pneumatic apparatus having a plurality of sensors serially arranged to sense associated jets of air, the obstruction of which is used to determine the advance of the film as it is passed therebetween.

11. Apparatus for automatically wrapping a package as in claim 8 in which there is also provided a lower turret on which is carried rolls of film of widths and thicknesses which substantially correspond to like rolls carried on the upper turret and in which there is provided means for gripping the end of the upper film and the end of the lower film and advancing each film to and by each other and to position them in an overlapped condition whereupon means is provided for joining the films to form a film curtain.

12. Apparatus for automatically wrapping a package as in claim 11 in which there is provided a film advancing mechanism operatively associated with every roll of film, each mechanism carried by and moved with the turret upon which the roll of film is stored.

13. The method of automatically sizing, weighing and at a later wrapping station forming a shrink wrap film envelope around a package such as a luggage member and then sealing and shrinking the film around the luggage member to protect the member, the selection of the proper film thickness resulting from weighing a luggage member and grossly measuring the height, width and length of the luggage member while advancing said luggage member toward a wrapping station and feeding the derived weight and size information to a computer for evaluating and feeding said information as functional signals to wrapping station apparatus whereat the method steps include: (a) selecting and delivering to the wrapping station at least one strip of shrink wrap film from a storage means having a plurality of film strips of various weights and thicknesses, the delivery of the selected film occurring in response to a functional signal from the computer and grasping the delivered film and positioning the film to form a curtain in the path of the advancing luggage member; (b) advancing the luggage member into said film curtain and causing a draping of the film over the luggage member; (c) sealing the upper and lower extents of film to form an envelope of film around the luggage member; (d) severing the sealed envelope from the strip of film at a determined distance from the encased luggage member and forming a trailing web of film attached to the sealed envelope, and (e) forming a handle aperture in said trailing web portion of film which web and aperture when heated thickens to provide a reinforced handle and support means.

14. The method of automatically wrapping a package as in claim 13 in which the step of grossly measuring the size of the luggage member includes employing a series of electric eye systems so that interruption of the beams of said systems by a luggage member placed in a determined position causes a size pattern and signal information therefrom to be fed to the computer.

15. The method of automatically wrapping a package as in claim 13 in which the delivery of film to the wrapping station includes providing a nultiplicity of rolls of film differing from one another as to widths, thicknesses and combinations thereof.

16. The method of automatically wrapping a package as in claim 15 in which the delivery storage of rolls of film includes the further step of arranging the rolls on upper and lower turrets and the steps of gripping the end of a selected upper roll and gripping the end of a selected lower roll and bringing the two ends of said rolls into an overlapped condition and in this condition joining the ends of overlapped film portions to form a curtain.

17. The method of automatically wrapping a package as in claim 13 in which the transporting and wrapping of the luggage member includes the further steps of arranging a conveyor system in which a first conveyor is disposed to receive and transport the just weighed luggage member; positioning a plurality of transversely disposed conveyors, each disposed to receive by means of an actuated transferring apparatus a luggage member from said first conveyor and providing a discharge conveyor to receive a luggage member delivered from the transverse conveyor.

18. The method of automatically wrapping a package as in claim 17 in which the transferring of the luggage member from the first conveyor to a transverse conveyor includes the additional steps of arranging a deflector means in association with each transverse conveyor and actuating one of said deflector means in response to a signal from the computer to selectively deflect the luggage member from the first conveyor to the transverse conveyor and the further step of providing like upper and lower rolls of film in association with each transverse conveyor and joining the ends to form a curtain into which an advancing luggage member is fed for wrapping.

19. The method of automatically wrapping a package as in claim 13 in which the film advancing includes the step of arranging a pair of mandrels in a substantially parallel manner and providing on each mandrel a plurality of like roller sections having resilient film engaging outer surfaces and between the roller sections guiding and supporting the film by positioning guide fingers to establish a guide path and rotating the mandrels to selectively advance and reverse the feeding of the film.

20. The method of automatically wrapping a package as in claim 16 in which the luggage advancing means is a conveyor disposed below the turret and there is provided the additional steps of sensing the end of an advanced film as it is fed to and past the upper surface of the supporting conveyor and the step of stopping the downward travel of the film in response to a signal from the computer as and when the luggage member is fed into the curtain to cause the luggage member to engage and travel on the lower extent of film.

21. The method of automatically wrapping a package as in claim 20, in which sensing the end of an advancing film includes the further step of arranging a determined sequence of pneumatic sensors in way of like spaced and positioned pneumatic jets so that when a film is passed therebetween signals derived from the interruptions of the jet air streams are fed to the computer for controlling the feeding of the strip of film.

22. The method of automatically wrapping a package as in claim 16 in which there is provided the additional step of providing a film advancing mechanism operatively associated with each roll of film and carrying said mechanism on the turret on which the roll of film is removably retained.

* * * * *